March 20, 1962  O. BAUMGÄERTEL  3,025,610
INSIDE CALIPERS
Filed Feb. 17, 1958  2 Sheets-Sheet 1
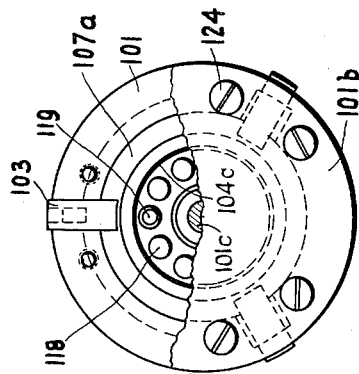
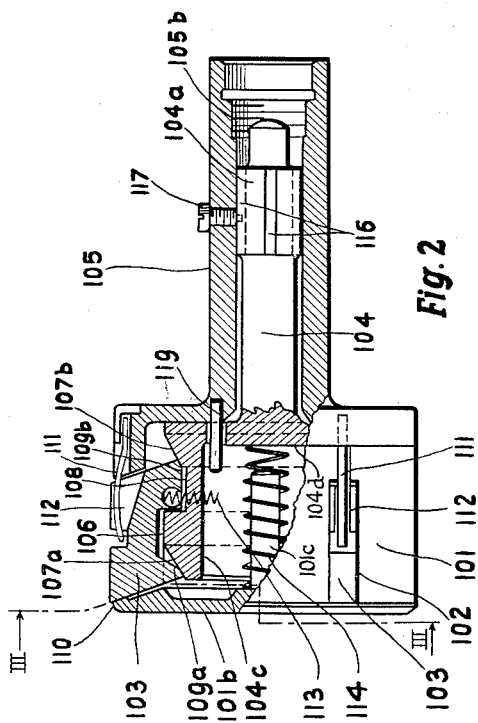
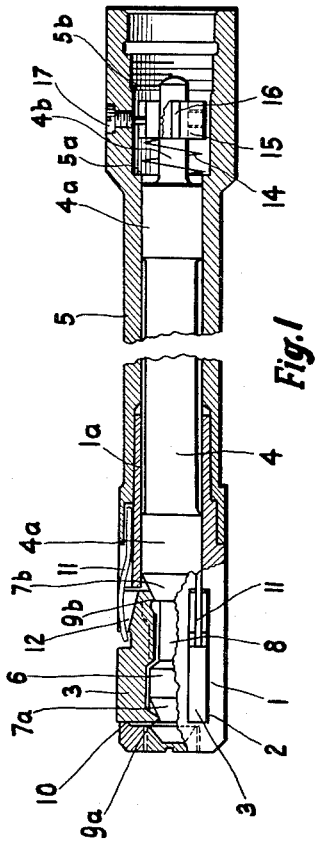
INVENTOR.
Oswin Baumgärtel
BY Michael S. Striker
Attorney March 20, 1962   O. BAUMGAERTEL   3,025,610
INSIDE CALIPERS
Filed Feb. 17, 1958   2 Sheets-Sheet 2
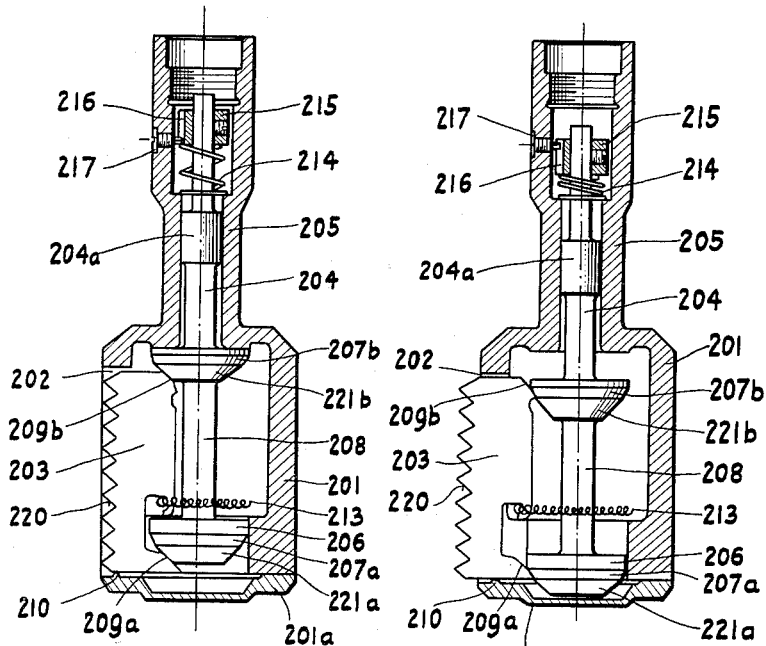
Fig. 4   Fig. 5   Fig. 6
INVENTOR.
Otto Baumgärtel
BY
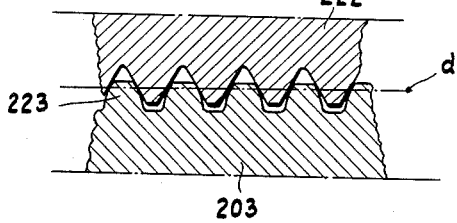

United States Patent Office 3,025,610
Patented Mar. 20, 1962

3,025,610
INSIDE CALIPERS
Oswin Baumgäertel, Neumalsch, near Malsch, Kreis Karlsruhe, Germany
Filed Feb. 17, 1958, Ser. No. 715,594
Claims priority, application Germany Feb. 20, 1957
14 Claims. (Cl. 33—199)

The present invention relates to improvements in inside calipers for measuring diameters and thread pitch diameters of cylindrical openings and tapped bores.

The improved instrument, having a plurality of feelers and non-rotatably mounted gauging cones, is intended for use with a micrometer or dial gauge for determination of actual diameters of bores, major, minor and pitch diameters of tapped holes, and diameters of blind bores extending in radial directions from a central opening.

Many inside calipers of known construction employ one or more feelers of round or rectangular cross-sectional contour which are mounted for movement at right angles or inclined with respect to the instrument axis, and a cone of predetermined taper which latter causes expulsion of the feelers from the caliper head until the feelers abut against the inner wall in a bore whose inside diameter must be measured. The caliper heads of such types of instruments are often connected with a micrometer gauge having a rotatable spindle, the latter extending into the caliper head and having its forward end shaped as a cone. Thus, as the cone forms part of the micrometer spindle, it must rotate when the instrument is put to use which results in rapid wear and unsatisfactory guiding of the cone. Since even a minimal wobbling of the spindle will adversely affect the precision of reading, such calipers at best are suitable for coarse but are unsatisfactory for precision measurements.

An all-important condition for attaining more precise readings is in that the feelers must be mounted in such a way as to positively prevent any tilting thereof, i.e., each feeler must be in firm contact with the caliper at three spaced points when the instrument is put to use. In all calipers of known construction, the inner faces of feelers distant from the walls of a bore are in firm contact with the cone and, in order to prevent tilting, each feeler must be snugly received in longitudinal or circular guide slots provided in the caliper head. However, as it is well known that a sliding fit inherently requires at least some play, a slight tilting of feelers is unavoidable even in more recent types of such instruments. Moreover, due to production requirements, a caliper head is usually made of unhardened metal, and rapid wear of its guide surfaces in actual use cannot be avoided. This results in angular displacement of guide surfaces and consequent change in the geometric design of the instrument. Such drawbacks are particularly felt in calipers whose sensing elements or feelers are inclined with respect to the instrument axis, the upper zone of each forward guide surface and the lower zone of each rear guide surface in the caliper head being subjected to substantial wear and thus causing faulty readings after relatively short periods of use.

In order to avoid tilting of sensing elements in inside calipers of known construction, the contact surfaces between the feelers and the caliper head are made as long as possible which, however, prevents the use of such bulky devices for gauging of relatively small inside diameters. For the same reasons, inside calipers of known construction contemplate the use of relatively slender cones with a diameter-to-length ratio somewhere between 1:10 and 1:20 so as to provide relatively long tapering surfaces for proper guidance of the feelers. The operating range of such instruments is relatively small and, if the feelers are at right angles to the caliper axis, the relatively large space necessary to permit axial displacements of the cone prevents gauging of blind bores adjacent to the closed end of an aperture. Moreover, in such devices, the full length of a slender cone cannot be utilized since, upon a certain displacement, the feelers are only partially in contact with the tapered surface of the cone and are thus likely to tilt because of unsatisfactory guidance. Consequently, the axial length of a feeler in such instruments is less than the cone length. In calipers for small inside diameters, the gauging surfaces of such feelers are extremely short and accordingly cannot insure proper centering of the device.

An important object of the invention is to provide a caliper in which any tilting movements of the feelers are prevented.

Another object of the invention is to provide an instrument of the above character whose calipering head is of such construction that, in addition to precise guidance of the feelers, its geometric design remains unchanged even after extended periods of use.

A further object of the invention is to provide an inside caliper capable of accomplishing the above objects which may be manufactured in all practical sizes for use in gauging extremely small and relatively large inside diameters. The lower limit in caliper size depends upon the resistance to wear and stresses of the material employed in manufacture of the implement.

An additional object of the invention is to provide an inside caliper which may be used in gauging of short or blind bores as close as about $\frac{1}{12}$ of an inch from the bottom, and with a satisfactory measuring range of between 10 and 15 percent of the caliper diameter.

A still further object of the invention is to provide a device of the above described character which has no rotating parts and is thus capable of extended use without noticeable wear to assure readings of greatly improved precision.

A yet further object of the invention is to provide an instrument which is of relatively simple construction and thus cheap in manufacture, and in which the parts are readily accessible for inspection, repair or replacement.

The above objects of the invention are attained by the provision of an inside caliper in which the rear face of each sensing element comprises a pair of nose-shaped projections abutting against a pair of rigidly connected and suitably spaced conical guides mounted on or integral with a spindle axially slidably received in the caliper head. The cones are of identical taper. Due to such twin guidance of the inner face of each feeler, no extensive parallel bearing surfaces are necessary in the caliper head, it being sufficient to provide a third support for each feeler at the front ends of slots in which the feelers are mounted in the instrument, preferably immediately adjacent to the outer cylindrical surface of the caliper. Such supports are formed by relatively short front end surfaces in the slots in which the feelers are mounted, and the front ends of the feelers abut thereagainst and slide therealong when the double-cone spindle is axially displaced. The rear end faces of the feelers thus need not participate in the guidance and cannot influence the precision of reading.

Due to the provision of two spaced cones on the caliper spindle, the length of each feeler in the axial direction of the instrument generally equals the distance between the cones and it is thus sufficient to facilitate proper centering of the caliper head. The meaning of "cones," as used in this description and in the appended claims, includes conical frusta or truncated cones as shown in the drawing.

By so supporting the feelers at three spaced points, i.e. on the tapering surfaces of two cones and on the front end wall of each slot in the caliper head, the geometrical design of the implement remains unchanged after even eventual wear of the last mentioned contact surface. Such arrangement permits of the use of feelers whose height, i.e., their dimension in the radial direction of the caliper head, is smaller than their length (dimension parallel with the instrument axis) regardless of the size of the caliper head. This practically eliminates the tilting of feelers and, in addition, the relatively long gauging surfaces of the feelers facilitate faultless centering of the caliper.

As above stated, no rotating parts are necessary and the stability and durability of the geometrical design depend only on hardened elements of the caliper. The double-cone spindle is prevented from rotation by a spline, a screw, a pin or a similar locking device which may be received in one of a number of annularly disposed slots or bores so as to permit angular adjustments of the spindle upon extended use. Thus, when the tapered surfaces of the cones are worn away because of continued sliding contact with the feelers, the spindle is slightly rotated to bring intact surfaces into engagement with the feelers. By so rotating the spindle, when necessary, the entire tapered surface of each cone may be put to use and the usable life of the caliper extended well beyond the life span of inside calipers of known construction.

In order to prevent them from dropping out of their slots in the caliper head, the feelers are constantly urged into contact with the cones either individually by means of leaf springs which are anchored in the caliper head or shank and extend into longitudinal grooves in the feelers, or collectively by an angular contraction spring passing through each feeler and surrounding the spindle within the caliper head. This latter form of means for holding the feelers in contact with the double-cone spindle is particularly suitable for use in relatively large calipers.

The retraction of the double-cone spindle in a small caliper into its idle position is achieved by a coil spring which may be mounted between the rear end of the spindle and the surrounding shank of the caliper head or, preferably in larger calipers, by a resilient element mounted in and acting between the caliper head and the spindle. The front end of the spindle is usually hollow to accommodate the spring and to reduce the overall weight of the implement.

According to a further modification of the invention, the gauging surfaces of the feelers may be externally threaded for use in tapped bores. If the operating range of a double-cone caliper is not sufficient for determination of depth of certain types of threads, a second pair of cones of different taper may be provided each adjacent to one of the first-mentioned cones; thus, each cone actually comprises a pair of meeting peripheral surfaces of different tapers and the radial range of the feelers is increased accordingly. Such modified caliper is particularly suitable for gauging diameters of threads at any desired point of a tapped hole by simply inserting the caliper head to a desired extent and thereupon radially moving the feelers with their externally threaded surfaces into meshing engagement with the internal threads of the tapped bore. In this type of calipers operating with a pair of twin cones, the feelers slide first along the cones of greater inclination with respect to the instrument axis so as to quickly move the external threads on the gauging surfaces of the feelers into mesh with the internal threads in a tapped bore. Only then are the feelers brought into contact with the less inclined cones, which latter thus control precision readings in contrast to the more inclined cones which are for coarse adjustment of the caliper.

Such a caliper may also be used for determination of thread pitch diameters in tapped bores by so shaping the profiles on the gauging surfaces of the feelers as to be in contact with the interior threads only in the actual zone of the thread pitch diameter. In other words, the crests and the roots of threads on the feeler surfaces are out of contact with the corresponding portions of internal threads in a tapped bore.

Other features, advantages and attributes of the novel device will become apparent in the course of the following detailed description of certain embodiments selected for illustration in the accompanying drawings wherein FIG. 1 illustrates, largely in axial section and partly in elevation, an inside caliper with feelers disposed at right angles to the instrument axis for use in bores of relatively small diameter;

FIG. 2 is a similar view of a modified instrument with inclined feelers for measuring of relatively large inner diameters;

FIG. 3 is an end view, partly broken away, of the modified instrument as seen from the line III—III of FIG. 2 in the direction of arrows;

FIG. 4 is an axial section through a further embodiment of the inside caliper with feelers disposed at right angles to the instrument axis in retracted position;

FIG. 5 is a view similar to that of FIG. 4, showing the feelers in extended position; and FIG. 6 is an enlarged radial section through an inner thread and a modified profile of the feeler.

Referring first to the embodiment of FIG. 1, the inside caliper therein shown comprises a hollow cylindrical head 1 having radially disposed slots 2 for accommodation of sensing elements or feelers 3. A double-cone spindle 4 has a pair of enlarged cylindrical zones 4a slidably received in a hollow shank 5, and a cylindrical zone 6 which is slidable in the surrounding bore of the caliper head 1. The reduced rear end 1a of caliper head 1 is press fitted into the shank 5. Member 6, forming part of spindle 4, is disposed between the cones 7a, 7b immediately adjacent to the larger diameter end of the former, its purpose being to prevent bending or breakage of spindle 4 at that point, especially in calipers for gauging of very small interior diameters.

Zone 8 adjacent to the boss 6 is of reduced diameter preferably smaller than the smallest diameter of the adjacent cone 7b.

Each feeler 3 is formed with a pair of nose-shaped projections 9a, 9b which abut against respective cones 7a, 7b. Since, in accordance with the instant invention, relatively steep cones are preferred, any axial displacement of spindle 4 in the direction toward the caliper head 1 immediately results in expulsion of feelers 3 in radial direction at right angles to the instrument axis and in simultaneous pressure of their front end faces against the adjacent end walls 10 of slots 2 in the caliper head. Due to such construction, the geometrical arrangement of parts remains unchanged even if the surfaces of end walls 10 should become worn after long periods of use. The opposing end faces of feelers 3 do not contact the adjacent wall of caliper head 1 and even a slot therebetween has no adverse influence on the measurements.

The noses 9a, 9b of feelers 3 are constantly urged into contact with the tapered surfaces of adjacent cones 7a, 7b by leaf springs 11. Each spring 11 has an end received in a slot provided in shank 5 outwardly adjacent to extension 1a of the caliper head, while its other end abuts against a shoulder at the opposing end of a longitudinal recess 12 provided in each feeler 3.

Rotation of spindle 4 is prevented by the provision of a collar 15 rigidly fixed to the reduced rear end 4b of the spindle, the peripheral zone of the collar defining a plurality of parallel grooves 16, one of grooves 16 receiving the end of a screw 17 which latter thus permits axial but no angular displacements of the spindle. After extended use of the caliper when the tapered surfaces of cones 7a, 7b are worn away to such an extent as to necessitate adjustments of spindle 4, screw 17 is removed and spindle 4 rotated so as to bring an intact peripheral area of cones 7a, 7b into contact with respective noses 9a, 9b of the feelers. Screw 17 is then again drawn tight whereby its end enters another of the grooves 16 in collar 15.

A relatively weak coil spring 14 is mounted on spindle 4 between an inner shoulder 5a in tubular shank 5 and collar 15, and thus constantly urges the spindle in a direction toward right so as to cause retraction of feelers 3 under the action of leaf springs 11.

The rear end of shank 5 is internally threaded, as at 5b, to facilitate connection of a micrometer or a dial gauge.

The caliper shown in FIGS. 2 and 3 is particularly suitable for gauging diameters of relatively large bores. Its head 101 is press fitted into the enlarged cup-shaped front end of shank 105 and is provided with uniformly spaced radial slots 102 to accommodate feeler elements 103 which are inserted for radial movements in a direction inclined with respect to the instrument axis. The outer surfaces of elements 103 are of substantially rectangular contour.

Boss 104a is integral with the rear end of spindle 104 and guides the latter in tubular shank 105. It also prevents angular displacements of spindle 104, and thus replaces the collar 15 shown in FIG. 1. To that end, the mantle of cylindrical boss 104a is formed with a plurality of axially parallel grooves 116 one of which receives the inner end of screw 117 to permit only axial displacement of the spindle with respect to shank 105 and caliper head 101. The rear end of shank 105 is internally threaded at 105b to facilitate connection of a micrometer or a dial gauge as above described.

The front end of spindle 104 defines two cones 107a, 107b with cylindrical zones 106, 108 therebetween. Analogously to part 6 in the embodiment of FIG. 1, cylindrical zone 106 guides the spindle 104 in a caliper head 101 by being in sliding contact with the adjacent inner wall of the latter. Springs 111 in grooves 112 provided in the outer surfaces of feelers 103 exert constant pressure against the feelers and thus urge their noses 109a, 109b into contact with the adjacent peripheral areas of cones 107a, 107b.

In addition to or as a replacement for springs 111, an annular coil spring 113 surrounds the reduced cylindrical zone 108 of the spindle and, by passing through suitable apertures in feelers 103, constantly urges the feelers into contact with the cones.

In such relatively large calipers, the forward or front end of spindle 104 is preferably hollow (see bore 104c) to reduce the overall weight of the instrument. This allows for provision of additional means to prevent angular displacements of spindle 104 with respect to the caliper head 101 and shank 105. As best shown in FIG. 3, the end wall 104d of bore 104c in the front end of spindle 104 is provided with a number of uniformly spaced apertures 118. One of apertures 118 receives a pin 119 which latter extends into an aligned bore provided in the shank 105. This arrangement, of course, may be provided in addition to or it may replace the screw 117.

Coil spring 114 is mounted in bore 104c between the spindle 104 and a lid 101b which latter is fixed to the cylindrical head 101 by means of screws 124 (see FIG. 3). Lid 101b also defines end walls 110 (see FIG. 2) whose surfaces are inclined with respect to the axis of head 101 and against which the front end faces of the feelers abut. A stud 101c is connected to the inner side of or integrally formed with the lid 101b and extends toward the end wall 104d of bore 104c to serve as a guide for the resilient element 114. The element 114 performs the same function as the element 14 of FIG. 1. It will be understood that the caliper of FIG. 2 may be provided with a resilient spindle-retracting element which operates between the spindle 104 and the shank 105 and thus replaces the element 114.

In the embodiments of FIGS. 4 and 5, the outer faces of feelers 203, mounted for sliding movement in radial directions at right angles to the instrument axis, have a V-thread profile 220 which is in exact accordance with the profile of a thread plug gauge such as is commonly used for inspection and measurement of inner threads. In order to increase the measuring range of the feelers, and in the event that the normal range of the caliper is insufficient to determine the depth of inner threads, the front end of spindle 204 defines, in addition to cones 207a, 207b, a second pair of cones 221a, 221b. As shown, cone 221a of greater inclination with respect to the instrument axis is immediately adjacent to and forms a continuation of cone 207a at the smallest diameter end of the latter. The position of cone 221b with respect to cone 207b is analogous. The cooperating surfaces of noses 209a, 209b are disposed in two relatively inclined planes with their inclinations corresponding to the taper of cones 207a, 221a and 207b, 221b, respectively. Other elements of the apparatus are similar to those described in connection with FIG. 1, and FIGS. 2, 3. No leaf springs are used for urging the noses of feelers 203 in recesses 202 into contact with the cones of spindle 204, annular coil spring 213 alone performing that function by being mounted about reduced zone 208 of the spindle and being received in open recesses provided in feelers 203. Head 201 and shank 205 are integral, and the spindle 204 is insertable through the front end of the instrument upon removal of lid 201a which latter defines end walls 210 in recesses or slots 202. The surface of end walls 210 serve as abutments for the front end faces of the feelers. Cylindrical zone 206 of spindle 204, which is immediately adjacent to the larger diameter end of cone 207a, is slidably received in the head 201, and a boss 204a is snugly fitted into the bore of shank 205 to prevent wobbling of the spindle. Angular displacements of member 204 are prevented by collar 215, grooves 216 in the latter, and a screw 217, these elements operating as above described in connection with FIG. 1.

Coil spring 214 is shown expanded in FIG. 4; thus, the threaded profile 220 of each feeler 203 is retracted into the caliper head 201. In FIG. 5, spring 214 is compressed and the feelers are in their extreme positions, the end face of cone 221a abutting against the inner face of lid 201a.

For determination of the median thread pitch diameter $d$ of an internal V-thread 222 shown in FIG. 6, a feeler 203 with a substantially Acme thread profile 223 may be employed. Threads 223 mesh with threads 222 only in the region of diameter $d$. The crests of the threads 223 are cut off and the roots between adjacent threads 223 enlarged to avoid contact with the crests of threads 222 save in the region of diameter $d$. By suitably shaping the outer surfaces of feelers 203, a linear contact with the side faces of internal threads can be achieved.

I wish it to be understood that I do not desire to be limited to the exact details of construction shown and described for obvious modifications will occur to persons skilled in the art within the spirit and scope of the invention as defined in the appended claims.

What I claim and desire to protect by Letters Patent is:

1. An inside caliper comprising, in combination, a hollow cylindrical head having a plurality of radially disposed slots and each slot having an end wall; a sensing element in each of said slots in constant abutment with the end wall of the respective slot, each sensing element having an outer surface extendable through one of said slots and distant from the axis of said head, and an inner surface in said head defining a pair of spaced noses; a coaxial tubular shank connected with one end of said head; a spindle in said shank extending into said head, said spindle having a pair of cones of equal tapers in said head spaced a distance substantially equal to that between the noses of each of said sensing elements with the inclined surface of each cone in contact with the adjacent nose of each of said sensing elements; resilient means for constantly urging the noses of said sensing elements into contact with the respective cones; said spindle having a cylindrical zone slidably received in said shank and defining a plurality of peripheral grooves parallel with the axis of said spindle; and a threaded element radially extending through said shank and into one of said grooves for restricting said spindle to axial movements with respect to said head and said shank.

2. An inside caliper comprising, in combination, a hollow cylindrical head having two ends and at least three spaced radially disposed slots, each slot having an end wall adjacent to one end of said head; a sensing element in each of said slots in constant abutment with the end wall of the respective slot, each sensing element having an outer surface of substantially rectangular contour distant from the axis of said head which is extendable through the respective slot and is formed with a recess therein, and an inner surface in said head defining a pair of spaced noses; a coaxial tubular shank connected with the other end of said head; a spindle in said shank extending through the other end of and into said head, said spindle having a pair of cones of equal tapers in said head spaced a distance substantially equal to that between the noses of each of said sensing elements with the inclined surface of each cone in contact with the adjacent nose of each of said sensing elements; a resilient element anchored in said head adjacent to each of said slots and extending into the recess in the outer surface of a respective sensing element for constantly urging the noses of said sensing elements into contact with the respective cones; said spindle having a cylindrical boss slidably received in said shank and the boss having a mantle formed with a plurality of peripheral grooves parallel with the axis of said spindle; and a threaded element radially extending through said shank and into one of said grooves for restricting said spindle to axial movements with respect to said head and said shank.

3. An inside caliper comprising, in combination, a hollow cylindrical head having two ends and at least three uniformly spaced radially disposed slots, each slot having an end wall adjacent to one end of said head; a sensing element in each of said slots in constant abutment with the end wall of the respective slot, each sensing element having an outer surface of substantially rectangular contour extendable through one of said slots and distant from the axis of said head, an inner surface in said head defining a pair of spaced noses, and an aperture between said noses; a coaxial tubular shank connected with one end of said head; a spindle in said shank extending through the other end of and into said head, said spindle having a pair of cones of equal tapers in said head spaced a distance substantially equal to that between the noses of each of said sensing elements with the inclined surface of each cone in contact with the adjacent nose of each of said sensing elements; an annular coil spring in the apertures of said sensing elements for constantly urging the noses of said sensing elements into contact with the respective cones; said spindle having a cylindrical boss slidably received in said shank and the boss having a mantle formed with a plurality of peripheral grooves parallel with the axis of said spindle; and a pin radially extending through said shank and into one of said grooves for restricting said spindle to axial movements with respect to said head and said shank.

4. An inside caliper comprising, in combination, a hollow cylindrical head having two ends and a plurality of spaced radially disposed slots, each slot having an end wall adjacent to one end of said head; a sensing element in each of said slots in constant abutment with the end wall of the respective slot, each sensing element having an outer surface of substantially rectangular contour extendable through one of said slots and distant from the axis of said head, and an inner surface in said head defining a pair of spaced noses; a coaxial tubular shank connected with one end of said head; a spindle in said shank extending through the other end of and into said head, said spindle having a pair of cones of equal tapers in said head spaced a distance substantially equal to that between the noses of each of said sensing elements with the inclined surface of each cone in contact with the adjacent nose of each of said sensing elements, said spindle further comprising a cylindrical zone located in said head and a cylindrical boss located in said shank; resilient means for constantly urging the noses of said sensing elements into contact with the respective cones; said cylindrical zone being disposed intermediate said cones and said head having a cylindrical bore for slidably and rotatably receiving said cylindrical zone; said boss having a mantle formed with a plurality of axially parallel peripheral grooves; and a screw radially extending through said shank and into one of said grooves for restricting said spindle to axial movements with respect to said head and said shank.

5. An inside caliper comprising, in combination, a hollow cylindrical head having two ends and a plurality of uniformly spaced radially disposed slots, each slot having an end wall adjacent to one end of said head; a sensing element in each of said slots in constant abutment with the end wall of the respective slot, each sensing element having an outer surface of substantially rectangular contour extendable through the respective slot and distant from the axis of said head, and an inner surface in said head defining a pair of spaced noses; a coaxial tubular shank connected with the other end of said head; a spindle in said shank extending through the other end and into said head, said spindle having a pair of cones of equal tapers in said head spaced a distance substantially equal to that between the noses of each of said sensing elements with the inclined surface of each cone in contact with the adjacent nose of each of said sensing elements; resilient means for constantly urging the noses of said sensing elements into contact with the respective cones; said spindle having a boss slidably received in said shank and the boss having a mantle formed with a plurality of peripheral grooves parallel with the axis of said spindle; a threaded element radially extending through said shank and into one of said grooves for restricting said spindle to axial movements with respect to said head and said shank; the end of said shank distant from said head being internally threaded for attachment thereto of a micrometer or dial gauge.

6. An inside caliper for gauging the diameters of bores, comprising, in combination, a hollow substantially cylindrical head having two ends and a plurality of radially disposed slots, each slot having an end wall adjacent to one end of said head; a sensing element radially slidably received in each of said slots and abutting against the end wall of the respective slot each sensing element having an outer surface distant from the axis of said head and extendable through one of said slots, and an inner surface in said head defining a pair of spaced noses; a coaxial spindle extending through the other end of and into said head and having a pair of spaced cones of equal tapers in said head with the inclined surfaces of said cones in contact with one nose of each of said sensing elements, said spindle having a forward end adjacent to the one end of said head and an axial bore in said forward end, said bore having an end wall formed with a plurality of circularly arranged apertures; and means received in one of said apertures and extending into said head for restricting said spindle to axial movements with respect to said head.

7. An inside caliper for gauging the diameters of bores, comprising, in combination, a hollow cylindrical head having a closed end, a plurality of uniformly spaced radially disposed slots and another end, each slot having an end wall adjacent to the closed end of said head; a sensing element radially slidably received in each of said slots and abutting against the end wall of the respective slot each sensing element having a substantially rectangular outer surface distant from the axis of said head and extendable through one of said slots, each said outer surface defining a recess, and each sensing element further having an inner surface located in said head and defining a pair of spaced noses; a coaxial spindle extending through the other end of and into said head, said spindle having a pair of cones of equal tapers located in said head and spaced a distance substantially equal to that between the noses of each of said sensing elements, the inclined surfaces of said cones being in contact with one nose of each of said sensing elements, said spindle further having a front end adjacent to the closed end of said head and an axial bore in said front end, said bore having an end wall formed with a plurality of circularly arranged apertures; means received in one of said apertures and anchored in said head for restricting said spindle to axial movements with respect to said head; a resilient element anchored in said head adjacent to each of said slots and extending into the recess in the outer surface of a respective sensing element for constantly urging the noses of said sensing elements into contact with said cones; and means for constantly urging said spindle in a direction toward the other end of said head.

8. An inside caliper comprising, in combination, a hollow cylindrical head having two ends and a plurality of spaced radially disposed slots, each slot having an end wall adjacent to one end of said head; a sensing element radially slidably received in each of said slots and abutting against the end wall of the respective slot, each sensing element having an outer surface of substantially rectangular contour distant from the axis of said head and extendable through one of said slots, and an inner surface located in said head and defining a pair of spaced noses; a coaxial spindle extending through the other end of and into said head, said spindle having a pair of spaced cones of equal tapers in said head with the inclined surfaces of said cones in contact with one nose of each of said sensing elements, said spindle further having a front end adjacent to the one end of said head and an axial bore in said front end, said bore having an end wall formed with a plurality of circularly arranged apertures; means received in one of said apertures and extending into said head for restricting said spindle to axial movements with respect to said head; annular resilient means operatively connected with each of said sensing elements located in said head and surrounding said spindle between said cones for constantly urging the noses of said sensing elements into contact with said cones; and resilient means disposed between the one end of said head and said spindle for constantly urging said spindle in a direction toward the other end of said head.

9. An inside caliper for gauging the diameters of bores, comprising, in combination, a hollow cylindrical head having two ends and at least three spaced radially disposed slots, each slot having an end wall adjacent to one end of said head; a sensing element radially slidably received in each of said slots and abutting against the end wall of the respective slot, each sensing element having an outer surface of substantially rectangular contour distant from the axis of said head and extendable through one of said slots, and an inner surface in said head defining a pair of spaced noses; a coaxial tubular shank connected to the other end of said head; a coaxial spindle in said shank extending through the other end of and into said head and having a pair of spaced cones of equal tapers in said head with the inclined surfaces of said cones in contact with one nose of each of said sensing elements, said spindle further having a front end adjacent to the one end of said head and an axial bore in said front end, said bore having an end wall formed with a plurality of circularly arranged apertures; means received in one of said apertures and extending into said head for restricting said spindle to axial movements with respect to said head; resilient means for constantly urging the noses of said sensing elements into contact with said cones; and resilient means in said shank for constantly urging said spindle in a direction away from the one end of said head.

10. An inside caliper for gauging the diameters of bores, comprising, in combination, a hollow cylindrical head having a closed end, another end and a plurality of uniformly spaced radially disposed slots, each slot having an end wall adjacent to the closed end of said head; a sensing element radially slidably received in each of said slots and abutting against the end wall of the respective slot, each sensing element having an outer surface of substantially rectangular contour distant from the axis of said head and extendable through one of said slots, and an inner surface in said head defining a pair of spaced noses; a coaxial spindle extending through the other end of and into said head, said spindle having a pair of spaced cones of equal tapers integrally connected thereto and located in said head with the inclined surfaces of said cones in contact with one nose of each of said sensing elements, said spindle further having a front end adjacent to the closed end of said head and an axial bore in said front end, said bore having an end wall formed with a plurality of circularly arranged apertures; a pin received in one of said apertures and extending into said head for restricting said spindle to axial movements with respect to said head; resilient means for constantly urging the noses of said sensing elements into contact with said cones; a coil spring in the bore of said spindle and acting against the closed end of said head for constantly urging said spindle in a direction away from the closed end of said head; and a tubular shank connected to the other end of said head for slidably receiving said spindle and having an internally threaded end distant from said head for attachment to an indicating device.

11. An inside caliper comprising, in combination, a cylindrical head having two ends and a plurality of radially disposed slots, each slot having an end wall adjacent to one end of said head; a sensing element radially slidably received in each of said slots and abutting against the end wall of the respective slot, each sensing element having a gauging surface distant from the axis of said head and extendable through the respective slot, and an inner surface defining a pair of noses located in said head; a spindle extending through the other end of and into said head and having a pair of similar cones, each of said cones having a pair of meeting peripheral surfaces of different inclinations with respect to the axis of said head, the distance between said cones being such that the noses of each sensing element are in contact with the surfaces of equal inclination of the respective cones; means for restricting said spindle to axial movements with respect to said head and resilient means disposed between said head and said spindle for constantly urging said spindle into a position in which the surfaces of greater inclination of said cones are in contact with the noses of each of said sensing elements.

12. An inside caliper for gauging thread diameters of tapped bores, comprising, in combination, a substantially cylindrical head insertable into a tapped bore, said head having two ends and a plurality of radially disposed elongated slots parallel with the axis of said head, each slot having an end wall adjacent to one end of said head; a sensing element radially slidably received in each of said slots and abutting against the end wall of the respective slot, each sensing element having a gauging surface defining a thread profile, said gauging surface being distant from the axis of said head and being extendable through the respective slot, each sensing element further having an inner surface defining a pair of spaced noses located in said head; a spindle extending through the other end of and into said head and defining therein a pair of similar coaxial cones, each cone having a pair of surfaces of different inclinations with respect to the axis of said head and disposed in such manner that the surface of greater inclination is adjacent to the smaller diameter end of each of said cones; the distance between the noses of said sensing elements being such that the noses of each sensing element contact the surfaces of equal inclination of said cones; resilient means for constantly urging said noses into contact with said cones; means for restricting said spindle to axial movements with respect to said head; and resilient means disposed between said head and said spindle for constantly urging the latter into a position in which the noses of said sensing elements are in contact with the more inclined surfaces of said cones.

13. An inside caliper for gauging thread diameters of tapped bores comprising, in combination, a hollow substantially cylindrical head insertable into a tapped bore, said head having a closed end, a plurality of radially disposed elongated slots parallel with its axis, and another end; a coaxial tubular shank connected to the other end of said head, each slot having an end wall adjacent to the closed end of said head; a spindle in said shank extending through the other end of and into said head and defining a pair of spaced coaxial cones of equal tapers in the latter, each of said cones having its smaller diameter end closer to the closed end of said head; said spindle having a pair of cylindrical zones slidably received in said head and said shank, respectively; means for restricting said spindle to axial movements with respect to said head and said shank; a sensing element radially slidably received in each of said slots and abutting against the end wall of the respective slot, each sensing element having a threaded gauging surface distant from the axis of said head and extendable through the respective slot, and an inner surface defining a pair of spaced noses located in said head and in contact with the incline dsurfaces of said cones; resilient means for constantly urging said noses into contact with the inclined surfaces of said cones; resilient means for constantly urging said spindle in a direction away from said head; and means for connecting the end of said spindle distant from said head with a micrometer or dial gauge.

14. An inside caliper for gauging thread diameters of tapped bores comprising, in combination, a hollow substantially cylindrical head insertable into a tapped bore, said head having a closed end, a plurality of radially disposed elongated slots parallel with its axis and another end, each slot having an end wall adjacent to the periphery and to the closed end of said head; a coaxial tubular shank connected to the other end of said head; a spindle in said shank extending through the other end of and into said head and defining a pair of coaxial spaced cones of equal tapers, each of said cones having a pair of surfaces of different inclination with respect to the axis of said head and the surfaces of greater inclination being located nearer to the closed end of said head; said spindle having a cylindrical zone between said cones axially and angularly slidable in said head and at least one cylindrical zone axially and angularly slidable in said shank; adjustable means for restricting said spindle to axial movements with respect to said head and said shank; a sensing element radially slidably received in each of said slots and abutting the end wall of the respective slot each sensing element having a threaded gauging surface distant from the axis of said head and extendable through the respective slot, and an inner surface defining a pair of spaced noses, each of said noses having a pair of meeting surfaces of inclinations similar to the inclinations of the surfaces of said cones, the noses of each sensing element being so spaced that the inclined surfaces thereof constantly abut the surfaces of same inclination of said cones; resilient means for constantly urging said sensing elements radially inwardly toward said spindle; and means for constantly urging said spindle in a direction away from the closed end of said head.

References Cited in the file of this patent

UNITED STATES PATENTS

| | | |
|---|---|---|
| 890,394 | Ahrens | June 9, 1908 |
| 1,433,076 | Green | Oct. 24, 1922 |
| 1,595,368 | Volis | Aug. 10, 1926 |
| 1,961,647 | Sonoda | June 5, 1934 |
| 2,047,607 | Zimmerman | July 14, 1936 |
| 2,316,877 | Maag | Apr. 20, 1943 |
| 2,361,336 | Volis | Oct. 24, 1944 |
| 2,566,160 | Bowers | Aug. 28, 1951 |

FOREIGN PATENTS

| | | |
|---|---|---|
| 612,457 | Great Britain | Nov. 12, 1948 |